(12) United States Patent
Karri et al.

(10) Patent No.: US 12,387,721 B2
(45) Date of Patent: Aug. 12, 2025

(54) MULTIUSER VOICE COMMAND VISUALIZATION

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Shailendra Moyal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 17/481,586

(22) Filed: Sep. 22, 2021

(65) Prior Publication Data

US 2023/0088513 A1 Mar. 23, 2023

(51) Int. Cl.
*G10L 15/22* (2006.01)
*G06F 3/16* (2006.01)

(52) U.S. Cl.
CPC .............. *G10L 15/22* (2013.01); *G06F 3/167* (2013.01); *G10L 2015/223* (2013.01); *G10L 2015/228* (2013.01)

(58) Field of Classification Search
CPC ... G10L 15/22; G10L 15/26; G10L 2015/223; G10L 15/08; G10L 2015/228; G06F 3/167; G06N 20/00
See application file for complete search history.

(56) References Cited

U.S. PATENT DOCUMENTS

| 9,817,634 | B2 | 11/2017 | Gupta | |
| 2001/0056349 | A1* | 12/2001 | St. John | G07C 9/37 704/270 |
| 2003/0185358 | A1* | 10/2003 | Sakamoto | G10L 15/26 704/E15.045 |

(Continued)

FOREIGN PATENT DOCUMENTS

| CN | 104715752 A | 6/2015 |
| CN | 106503156 B | 9/2019 |

(Continued)

OTHER PUBLICATIONS

Anonymous. "AI based Collective Voice Control Collaboration among Audio Conference Participants." Published Feb. 8, 2018. 4 pages. Published by IP.com. https://priorart.ip.com/IPCOM/000252776.

(Continued)

*Primary Examiner* — Michael N Opsasnick
(74) *Attorney, Agent, or Firm* — Steven Bouknight; Andrew D. Wright; Calderon Safran & Wright P.C.

(57) ABSTRACT

A processor may receive a first command and a second command from one or more users. A processor may analyze the first command and the second command. A processor may determine command information associated with the first command and the second command. A processor may display the command information to at least one of the one or more users on a display screen. A processor may receive a response from the at least one of the one or more users associated with the command information on the display (Continued)

screen. A processor may execute the first command and the second command based, at least in part, on the command information and the response.

20 Claims, 5 Drawing Sheets

(56) References Cited

U.S. PATENT DOCUMENTS

| | | | | |
|---|---|---|---|---|
| 2006/0286969 | A1* | 12/2006 | Talmor | G06F 21/32 |
| | | | | 379/142.01 |
| 2015/0206529 | A1* | 7/2015 | Kwon | G10L 17/22 |
| | | | | 704/246 |
| 2016/0358603 | A1* | 12/2016 | Azam | G10L 15/26 |
| 2017/0220361 | A1 | 8/2017 | Sharma | |
| 2018/0268818 | A1* | 9/2018 | Schoenmackers | G10L 15/26 |
| 2019/0028803 | A1* | 1/2019 | Benattar | H04S 7/304 |
| 2019/0103111 | A1 | 4/2019 | Tiwari | |
| 2019/0138272 | A1* | 5/2019 | Ahn | G06F 3/167 |
| 2019/0311718 | A1 | 10/2019 | Huber | |
| 2019/0378516 | A1 | 12/2019 | Kline | |
| 2021/0174795 | A1* | 6/2021 | Robert Jose | G10L 15/22 |
| 2021/0366476 | A1* | 11/2021 | Smith | G10L 15/083 |
| 2022/0157314 | A1* | 5/2022 | Varshney | G06F 16/90332 |
| 2022/0180867 | A1* | 6/2022 | Bobbili | G10L 15/30 |
| 2022/0406301 | A1* | 12/2022 | Barros | G06F 40/295 |
| 2023/0020504 | A1* | 1/2023 | Moon | G06N 20/00 |

FOREIGN PATENT DOCUMENTS

| | | |
|---|---|---|
| CN | 110663021 A | 1/2020 |
| CN | 110710170 A | 1/2020 |
| CN | 111785266 A | 10/2020 |
| CN | 111868824 A | 10/2020 |
| JP | 2018525751 A | 9/2018 |
| KR | 20190064613 A | 6/2019 |

OTHER PUBLICATIONS

Anonymous. "Method and system for recalling complete or partial voice command submitted to AI voice assistance system." Published Mar. 12, 2020. 5 pages. Published by IP.com. https://priorart.ip.com/IPCOM/000261525.

Grabham, Dan. "Amazon Echo Show 5 review: Honey, I shrunk the screen." Published Apr. 28, 2020. 17 pages. Published by Pocket-lint. https://www.pocket-lint.com/smart-home/reviews/amazon/148502-echo-show-5-review.

Mell, et al., "The NIST Definition of Cloud Computing," Recommendations of the National Institute of Standards and Technology, U.S. Department of Commerce, Special Publication 800-145, Sep. 2011, 7 pgs.

* cited by examiner

MULTIUSER VOICE COMMAND VISUALIZATION

BACKGROUND

The present disclosure relates generally to the field of artificial intelligence, and more particularly to the field of smart devices.

Smart devices have evolved over time to accomplish various tasks for humans, making our lives easier. Such devices can be found in people's homes and offices to assist people with some aspect of their day. As these devices have grown in popularity, so too have their usefulness and their ability to enhance users' daily experience.

SUMMARY

Embodiments of the present disclosure include a method, computer program product, and system for managing a smart device. A processor may receive a first command and a second command from one or more users. A processor may analyze the first command and the second command. A processor may analyze the first command and the second command. A processor may determine command information associated with the first command and the second command. A processor may display the command information to at least one of the one or more users on a display screen. A processor may receive a response from the at least one of the one or more users associated with the command information on the display screen. A processor may execute the first command and the second command based, at least in part, on the command information and the response.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
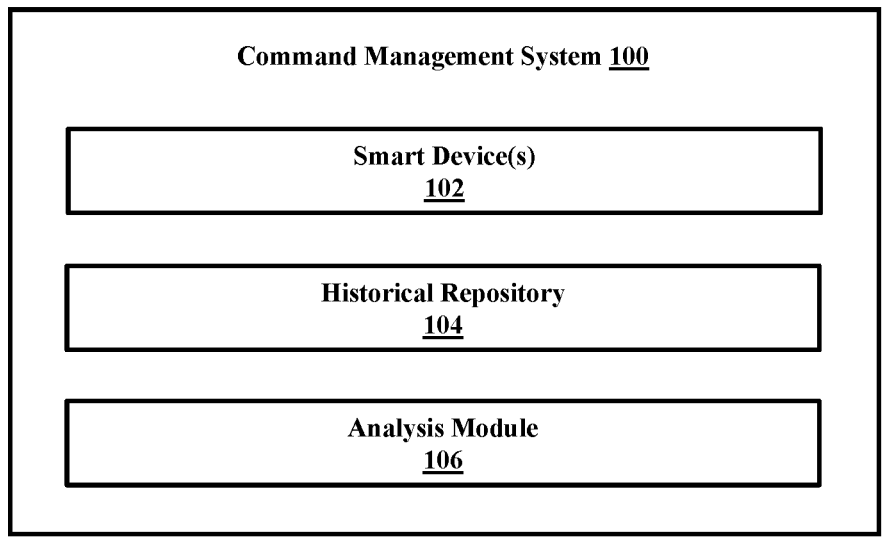
FIG. 1 depicts a block diagram of an embodiment of a command management system, in accordance with the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present disclosure relates generally to the field of artificial intelligence, and more particularly to the field of smart devices, such as artificial intelligence (AI) voice assistant devices. While the present disclosure is not necessarily limited to such applications, various aspects of the disclosure may be appreciated through a discussion of several examples using this context.

The demand for personal computing devices or smart devices has risen significantly over the years as the usefulness of such devices has expanded into both a person's home and work-life. Often such devices connect to one or more other devices or networks, allowing the devices to interact with each other and provide more utility for a user. For example, a user of a smart device may be able to order a product from a website using commands (e.g., voice commands or gestures) and have the product shipped directly to them. The usefulness of such smart devices is compounded when combined with artificial intelligence (AI). Such AI enabled smart devices can be configured into a type of virtual assistant and generate an AI assistance system capable of performing complex tasks (e.g., tasks traditionally performed by a personal assistant).

Traditional AI assistance systems often include one or more smart devices configured to receive one or more commands from a user and execute those activities or provide information to the user. Unfortunately, in many situations, smart devices may receive multiple commands from multiple users within the same timeframe. While in some situations each command may be unrelated, in other situations some of the multiple commands issues within the same timeframe may include information that is complementary, conflicting (e.g., contradictory), and/or unrelated to the other commands. For example, User A, User B, and User C may each issue a voice command to a smart device around the same time. Continuing this example, User A may issue a command to, "order a pizza from a local pizzeria," User B may issue a command that requests, "scores to the football game," and User C may issue a command that states, "the pizza should not have pepperoni on it." In these situations, the combination of commands within the same timeframe may cause confusion not only to the user, who may accidently order something they do not want, but also the smart device. In this example, the smart device may incorrectly determine that a pizza is not wanted by the users or may order a pizza with pepperoni. As such, there is a desire for a smart device capable of managing commands from multiple users within the same timeframe.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow.

Also, any device depicted in the drawings can be a different device. For example, if a mobile device is shown sending information, a wired device could also be used to send the information. The term "module" may refer to a hardware module, software module, or a module may be a combination of hardware and software resources. Embodiments of hardware-based modules may include self-contained components such as chipsets, specialized circuitry, one or more memory devices and/or persistent storage. A software-based module may be part of a program, program code or linked to program code containing specifically programmed instructions loaded into a memory device or persistent storage device of one or more data processing systems operating as part of the computing environment (e.g., command management system 100).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

In embodiments discussed herein, solutions are provided in the form of a method, system, and computer program product, for managing a smart device. Embodiments contemplated herein enable multiple users to issue commands to a smart device (e.g., computing device). Traditional smart devices, particularly those associated with AI assistant devices, may often cause confusion in situations where multiple users issue commands within the same timeframe. In situations where multiple users have issued commands, the smart device may receive some commands that include information that is unrelated (e.g., out of context) of the other commands or may also include information that either compliments or conflicts with other commands.

Embodiments contemplated herein, allow a smart device (e.g., computing device) to manage commands from multiple users to ensure that the intended commands issued by each user are able to be properly executed by the smart device. In embodiments, collected/received commands from multiple users may be analyzed by the computing device using AI and machine learning techniques. In such embodiments, these analyses may be used to determine/identify if there are any command correlations or connections between the multiple commands, particularly those issued within the same timeframe. The command correlations and associated analysis information may be displayed to at least one of the multiple users to ensure the smart device has sufficient and/or accurate data needed to properly execute the multiple commands.

In embodiments, the computing device or smart device (e.g., AI assistance device) may be configured to perform the functions via a processor of the computing device. For example, the computing device may be configured by a processor utilizing software, an application, etc. In some embodiments, a computing device may be configured with AI capabilities and function as an AI assistance device. The computing device may include, but is not limited to, devices such as, a smartwatch, voice assistant device (e.g., Google Home®, Amazon Alexa®, Siri®, Bixby®, etc.), Internet of Things (IoT) device(s), any smart device, or any combination thereof. While embodiments herein often refer to a single computing device, any number of computing devices may be used, either independently or in concert with other smart devices. In addition, while various embodiments disclosed herein may make reference to a computing device configured as an AI assistance device (e.g., within an AI assistance system), such embodiments should not be construed as limiting and any computing device contemplated herein may be used with or without AI capabilities.

In embodiments, as referenced above, the computing device may be configured to receive one or more commands from more than one user (e.g., multiple users). The computing device may include any number of IoT devices and/or other sensors configured to receive and/or execute a user's commands. For example, in one exemplary embodiment, the computing device may be configured with at least a microphone and a speaker to detect and receive information (e.g., a voice command from a user). While embodiments contemplated herein often refer to the computing device as receiving voice commands (e.g., direct and indirect commands) from a user, the computing device may be configured to receive commands from a user in a variety of ways. While each user may gesture or voice a command, in other embodiments, a user may remotely issue commands to the computing device by interacting with an application on a different device (e.g., a mobile phone) configured to connect to the computing device.

In embodiments, a processor may analyze the one or more commands received from multiple users within a similar timeframe. While in some embodiments, a similar timeframe may include any particular time duration (e.g., as directed by an administrator of the smart device), in other embodiments, a similar timeframe may include any commands that are issued at approximately the same time and/or may be overlapping. For example, in some embodiments, a processor may determine all the commands issued within a particular time duration (e.g., all the commands issued in the same five minutes) are provided in the same timeframe. In other embodiments, a processor may determine that commands issued from multiple users in where the commands are issued consecutively or in an overlapping manner are within the same timeframe. For example, two different users could issue two different commands at the same time while a third user issues another command when the original two users are finished speaking (e.g., finished issuing their commands). In this example embodiment, a processor could determine that all three commands were issued within the same timeframe.

In embodiments, a processor analyze the one or more commands from each of the multiple users for command information. In these embodiments, command information may include a variety of information that a processor may accumulate during analysis, such as the information/data used and/or generated by AI and machine learning techniques (e.g., historical data) or gathered by Internet of Things (IoT) devices. Command information may include, but is not limited to, user identity components (e.g., analyzing the power bandwidth of the user issuing the command), information generated by natural language processing (NLP) or other analyses associated with determining the general meaning of the command (e.g., knowledge corpus, command components, etc.), and/or any other data/information that may be used to determine the relationship between commands issued by multiple users.

In some embodiments, a processor may store historical data in a historical repository. Historical data may include command information associated with some or all of the commands received by the computing device. This historical data may include commands and/or command information associated with multiple users generating one or more commands within a particular timeframe as well as those commands executed from individual users outside the particular timeframe. For example, a processor may store command information associated with commands simultaneously issued by more than one user as well as data associated with commands issued by a single user (e.g., those commands typically executed by AI assistant devices). In embodiments, a processor may access the historical repository and access the historical data. A processor may analyze the historical data using AI and machine learning techniques to determine and identify if there is a command relationship or command correlation between different commands issued by multiple users.

In embodiments, a processor may analyze the command information associated with each of the commands to determine or identify which user issued each command. In such embodiments, a processor may have access to one or more user profiles associated with one or more users. A processor may configure user profiles over time based, at least in part, on historical command information (e.g., using AI and machine learning techniques). In these embodiments, a processor may access the one or more user profiles to identify the particular user. A user profile may have one or more identity components a processor may utilize to confirm a user's identity. Identity components may include, but are not limited to, voice identifying data and face identifying data. For example, a processor may be configured to analyze a user's voice (e.g., analyzing the power bandwidth of the voice) and identify the user by comparing the voice identifying data compiled in a user profile to the command information collected by the computing device.

In embodiments, a processor may access and analyze historical data from the historical repository. In some embodiments, a processor may use AI and NLP capabilities to analyze the historical data (e.g., historical command information) to generate a knowledge corpus. In these embodiments, a processor may use the generated knowledge corpus to analyze and identify one or more command components associated with each command (e.g., using NLP capabilities) issued. In embodiments, a command issued by a user may range in complexity from a few words or phrases to multiple sentences. As such, a command may be portioned or split into different command components that reflect different contexts (e.g., subjects), meanings, or phrases. For example, the command, "turn up the radio volume" may only have one command component (e.g., radio volume), while the command, "order a notebook from Store A" may have two command components (e.g., notebook and Store A). Command components may be considered a type of command information and may be stored in a historical repository as historical data for future analyses.

In embodiments, a processor may use the knowledge corpus and/or command information (e.g., command components) to determine the command relationship, or the correlation or relationship between the various commands issued by multiple users. The command relationship may indicate whether there is a correlation between commands and, if there is a correlation, whether the correlation or command relationship is complementary or contradictory. In embodiments where a processor determines there is no correlation between commands, the processor may have determined that the command is out of context or does not share a context with the one or more other commands. In some embodiments, a processor may use the knowledge corpus to predict and/or identify how different commands may be impacted by the other commands issued in the same/similar timeframe.

In embodiments, a processor may analyze command information to determine the command relationship based, at least in part, on the context of each command and/or command components (e.g., using the generated knowledge corpus) associated with each command. The context of a command and/or command component may refer to the topic or category of the command. In embodiments where a processor determines that one or more of the commands does not share a similar context to other commands issued by the other users, a processor may identify that the command relationship between commands is unrelated and the commands are independent from each other. For example, a first user may issue a command associated with ordering pizza while a second user, at approximately the same time (e.g., overlapping the first user's command or issued immediately after the first user's command was issued), may issue a command associated with requesting the day's weather. In this example, a processor may analyze the command information (e.g., different command components associated with each command) issued by the first user and second user and identify that the context of the command components of the first user's command are related to food and the context of the command components of the second user's command is associated with weather data. Accordingly, a processor would likely determine that the command associated with food was unrelated to the command associated with weather data. As such, a processor could identify that each of the commands is out of context or independent of the other. Simply, the processor's execution of the first user's command is independent of the second user's command.

In embodiments where a processor determines that one or more of the commands or command components share a similar context to other commands issued by the other users, a processor may determine whether the command relationship between commands is complementary and/or contradictory. For example, a first user may issue a command associated with ordering pizza and a second user may issue a command, at approximately the same time, associated with ordering pizza from a particular pizzeria. In such example embodiments, a processor may utilize AI and machine learning capabilities to analyze each users' command (e.g., command components) and determine that the context of each of the two commands is similar and/or related.

In embodiments where a processor determines the context of the commands (e.g., a command component or portion of the command) issued by multiple users are related or similar, a processor may determine whether the command relationship is complementary and/or contradictory. A complementary command relationship may include command information associated with a particular command that adds information or data to the other command or commands without conflict. A contradictory command relationship may include command information associated with a particular command that contradicts or creates a conflict associated with at least a portion of one or more commands (e.g., command component) issued by the multiple users.

Continuing the above example, a processor may analyze the command to order pizza from a first user and the command to order the pizza from a particular pizzeria from a second user. In this example, using the command information, a processor may determine that while the command from the second user includes additional elements that may be associated and/or necessary to properly execute the first user's command, that because none of command components contradict each other, the command relationship is complimentary. Alternatively, if the first user issued a command to order pizza from Pizzeria A, and the second user issued a command to order pizza from Pizzeria B, a processor would determine that while the commands shared a similar context, the commands were contradictory because they requested the processor to order pizza from different pizzerias, which may cause a conflict.

In another example embodiment, User A may issue a command, "please order vegetarian food for dinner," User B may issue a command, "tonight's vegetarian dinner is a reward for getting a promotion," User C may issue a command, "I want non-vegetarian food for dinner tonight," and User D may issue a command, "the vegetarian food should be ordered from Vegetarian Restaurant A." In this example embodiment, a processor, may analyze each command and associated command components and determine whether each command issued by the four users is related (e.g., similar context related to dinner). The processor could determine that, because each command includes information associated with ordering dinner, the commands are related. As such, a processor may further analyze the command information (e.g., command components) associated with each command and determine which commands are complementary and/or which commands are contradictory. Using the above example, a processor (utilizing AI capabilities, the generated knowledge corpus, etc.) may identify that User A, User B, and User D issued commands each have a complementary command relationship with each other. In this example embodiment, the processor could determine that the command issued by User D added additional information (e.g., from Vegetarian Restaurant A) to User A's command to order vegetarian food and that User C issued a command having contradictory information (e.g., wanting something contrasting from User A, User B, and User D). While User B's command does not add additional information or data relevant to User A's and User D's command, neither does User B's command cause a conflict. In other words, User B's command does not alter how the processor (e.g., smart device) would execute User A's and User D's command. As such, in some embodiments, a processor may determine that a command that shares a similar context with other commands, but does not add additional information or have conflicting criteria when compared to the other commands, has a complementary command relationship.

Continuing this example, a processor may determine the command relationship associated User C's command when compared to the other commands, is contradictory. A processor may identify that User C's command has a contradictory command relationship because, unlike User D's comment which expounds upon or adds information associated with User A's request for vegetarian food by requesting the food be ordered from a particular restaurant, User C's comment requesting non-vegetarian food is in conflict with User A's and User D's command. In situations where all three commands (User A's, User C's, and User D's command) are executed, there is likely to be confusion caused by the lack of clarity (e.g., regarding what is requested by each of the users) and an increased potential for mistakes or errors regarding the addition of commands, associated with both complementary and contradictory commands.

To mitigate the possibility of processing mistakes resulting from this lack of clarity and to ensure commands may be properly executed, a processor may utilize AI and machine learning capabilities to perform various analyses to determine command information that may allow such mistakes or errors to be reduced or mitigated. For example, a processor may analyze historical information and the commands issued by each user to determine if one or more of the commands issued may need modification, determine if additional command data is required in order for the processor to successfully execute a particular command, and/or predict or identify what additional command data may be needed to execute the one or more commands. For example, in embodiments where a user issues a command using a new colloquialism or slang or may use words or phrases with multiple meanings, despite the use of AI and machine learning capabilities, it may be possible that a processor is unable to determine the meaning of the issued command. In these embodiments, a processor may indicate or flag the command and notify the user or users (e.g., via a display screen) that the command needs to be modified. In an example embodiment, a User A may issue a command "Order Pizza from Pizzeria A" and User B may issue a command "I want cheese on my Pie." In this example embodiment, a processor may flag User B's command and notify at least one of the users (e.g., User A and/or User B) that they need to modify or reissue the command to remove the ambiguity of the word.

Continuing the above example, a processor may also or alternatively flag User B's command and notify at least one of the users that additional information may be needed to properly execute the command. In this example, a processor could configure the smart device (e.g., via text on a display screen and/or audibly ask) to request at least one of the users to provide additional information regarding what User B intended to issue in their command, a type of savory pie, or a pizza. In some embodiments during analysis of the commands, a processor may identify or predict possible meanings of the command. In these embodiments, a processor may provide the options to at least one of the users to select from. For example, returning to User B's command, a processor could provide User A or User B with options regarding what pie is referring to (e.g., pizza, savory pie, or a type of fruit pie). In embodiments, a processor may configure a display to show such command information as well as command information contemplated herein.

In embodiments, a processor may configure a display screen associated with the smart device to display command information. In these embodiments, a processor may display this aforementioned information on one or more display screens. While in some embodiments, a processor may configure a screen associated with the smart device to display command information, in other embodiments, a processor may be configured to send command information to one or more other screens, such as those associated with other smart devices (e.g., each user's mobile phone, smart tv, or computer).

In embodiments, a processor may analyze and select what command information may be displayed on the one or more display screens. While in some embodiments, a processor may configure the display screen to any form of command information as contemplated herein, in other embodiments, a processor may prioritize displaying particular command information to at least one of the users. For example, a processor may prioritize displaying notifications associated with the request for modification of a command and/or the need for additional information over other forms of command information that are needed to properly execute one or more of the commands. While in some embodiments the smart device may be configured with a screen to display command information, in other embodiments, a processor may be configured to display command information on display screens proximate to the user. For example, if one user is in a different room than the other users, a processor may be configured to display the command information on a smart TV located in the same room as the user or may display the command information on the user's smart watch or smart phone (e.g., via an application, email, text message, etc.).

In some embodiments, a processor may display on the display screen command information, such as that associated with the context and/or command relationship between each of the one or more commands. For example, in some embodiments, a processor may display a knowledge corpus depicting the various contexts of the issued commands. In embodiments, a processor may use AI capabilities to generate a dependency chart or an intersection diagram regarding how each command is related to the other issued commands. In some embodiments, the dependency chart or intersection diagram may be used to indicate how the user should modify the command or may indicate how the processor has interpreted the commands (e.g., allowing the user to confirm the accuracy of the command interpretation or that the command interpretation is incorrect). In these embodiments, a processor may display whether the commands are out of context and/or have a complementary command relationship or a contradictory command relationship. In some embodiments, a processor may use this command information (e.g., command relationship and historical command information) and AI capabilities to generate how one command may be affected by other commands issued within the same or similar timeframe.

In embodiments, a processor may be configured to receive feedback from the one or more users regarding the command information displayed on the display screen. For example, the display screen may be configured to allow the users to respond to the requests for command modification or additional information. In some embodiments, the display screen may be a touch screen that allows the one or more users to select the modified command, select a predicted component of additional information, or input an response associated with the request for additional information. In some embodiments, a processor may collect/receive feedback audibly (e.g., the user issues a modified verbal command). In some embodiments where one or more users receive command information on a display screen associated with another smart device, a processor may be configured to receive responses or feedback from the user from the smart device. For example, if a user receives command information on their smart phone via a text message, such as a request for a modified command, a user may provide their response to the processor via a responding text message. In some embodiments, a processor may prompt the user for additional information by displaying different questions associated with the particular command. A processor may utilize embodiments contemplated herein to analyze and determine what questions may elicit the user to supply the necessary additional information.

In some embodiments, a processor may highlight or particularly indicate all or some of the command information displayed on the screen. For example, in embodiments where a processor determines a command modification or additional information is needed, a processor may highlight this particular command information while leaving other command information, not requiring a response, unhighlighted. In some embodiments, a processor may use highlighting or some other indicating method to differentiate between commands issued by different users. For example, User A and User B may each issue a command. In this example embodiment, a processor may display each command and highlight User A's command in green and User B's command in red. In other embodiments, different types of highlighting may correspond to a processor's request for a command modification and/or additional information. For example, if a processor determines, that in order to process or properly execute a command, additional information is needed, the processor may highlight the entire screen as red to indicate to the users that additional information is required before one or more of the commands issued in a same/similar timeframe can be executed by the smart device.

In embodiments where a user issues a response associated with a request for command modification and/or additional information, a processor may receive the command modification or additional information and execute the command based on the command information and the response of one or more of the users.

Referring now to FIG. 1, a block diagram of an command management system 100 for managing a smart device, is depicted in accordance with embodiments of the present disclosure. More particularly, command management system 100 enables a smart device to manage commands issued by multiple users FIG. 1 provides an illustration of only one implementation and does not imply any limitations with regard to the environments in which different embodiments may be implemented. Many modifications to the depicted environment may be made by those skilled in the art without departing from the scope of the invention as recited by the claims. In some embodiments, the solar panels may be directed by the computing device to move to a more advantageous angle.

In embodiments, command management system 100 may include one or more smart devices 102, historical repository 104, and analysis module 106. In embodiments, command management system 100 may be configured to receive one or more commands from smart device 102 from one or more users within the same or similar timeframe. In embodiments, command management system 100 may store historical command data associated with commands historically executed commands by the smart device in historical repository 104. In embodiments, command management system 100 may analyze the command information associated with commands issued by multiple users within the same or similar timeframe and historical command data accessed from historical repository 104, using analysis module 106. In embodiments, analysis module 106 may be configured to perform any analyses contemplated herein including, but not limited to, analyses associated with AI, machine learning, NLP, or any combination thereof. In embodiments, command management system 100 may be configured to display command information to at least one of the one or more users on a display screen, such as a display screen associated with the smart device. In some embodiments, command management system 100, based at least in part on the command information displayed on the display screen, may request at least one of the one or more users provide a response (e.g., modified command and/or additional information) associated with the commands issued within the same timeframe. In these embodiments, command management system 100 may be configured to receive the response from one or more of the users. In embodiments, command management system 100 may then execute the commands issued by multiple users. This may be based on the command information displayed as well as based on a user responding to a request for a modified command, additional information, and/or a user confirming the interpretations of the commands issued or selecting a predicted option (e.g., predicted command modifications and predicted additional information).

Figure 2:
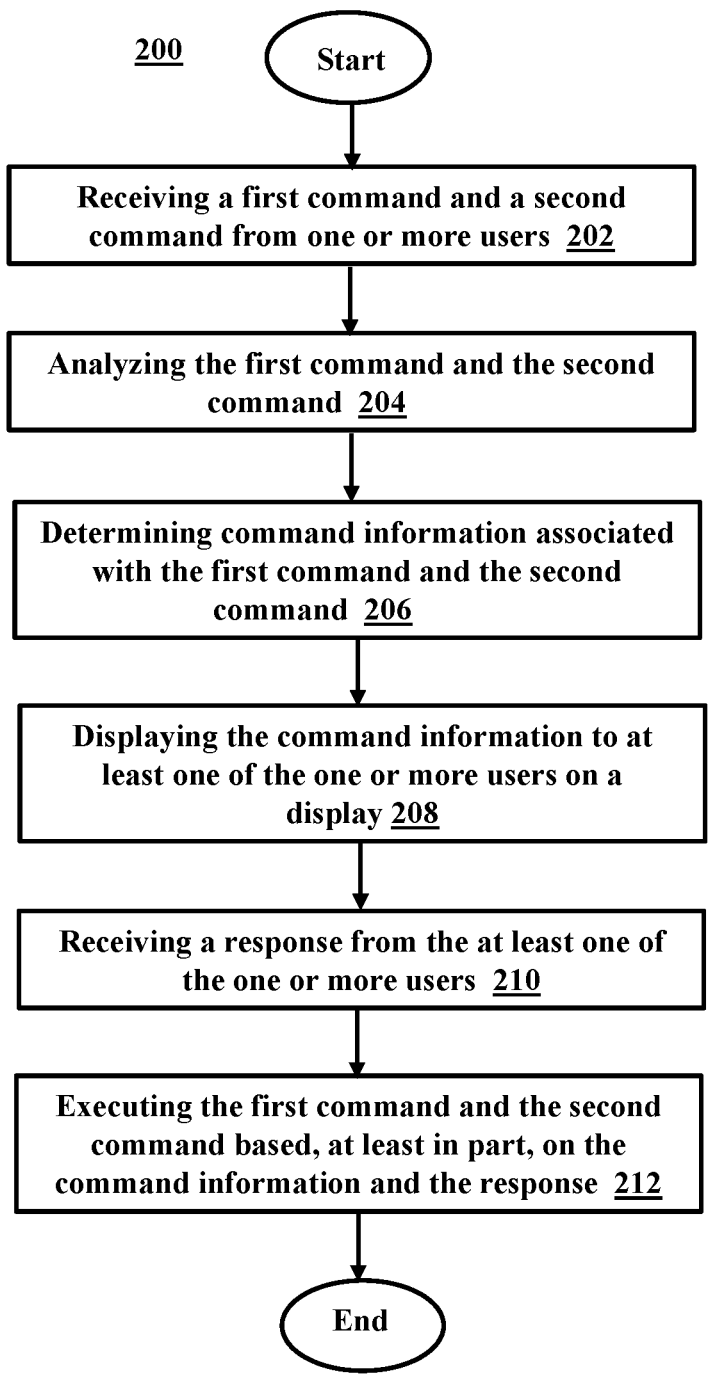
FIG. 2 illustrates a flowchart of a method for managing a smart device, in accordance with embodiments of the present disclosure.

Referring now to FIG. 2, a flowchart illustrating an example method 200 for storing one or more objects in a smart storage area, in accordance with embodiments of the present disclosure. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

In some embodiments, the method 200 begins at operation 202 where a processor may receive a first command and a second command from one or more users. In some embodiments, the method 200 proceeds to operation 204.

At operation 204, a processor may analyze the first command and the second command. In some embodiments, the method 200 proceeds to operation 206.

At operation 206, a processor a processor may determine command information associated with the first command and the second command. In some embodiments, the method 200 proceeds to operation 208.

At operation 208, a processor may display the command information to at least one of the one or more users on a display screen. In some embodiments, the method 200 proceeds to operation 210.

At operation 210, a processor may receive a response from the at least one of the one or more users associated with the command information on the display screen. In some embodiments, the method 200 proceeds to operation 212.

At operation 212, a processor may execute the first command and the second command based, at least in part, on the command information and the response. In some embodiments, as depicted in FIG. 2, after operation 212, the method 200 may end.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
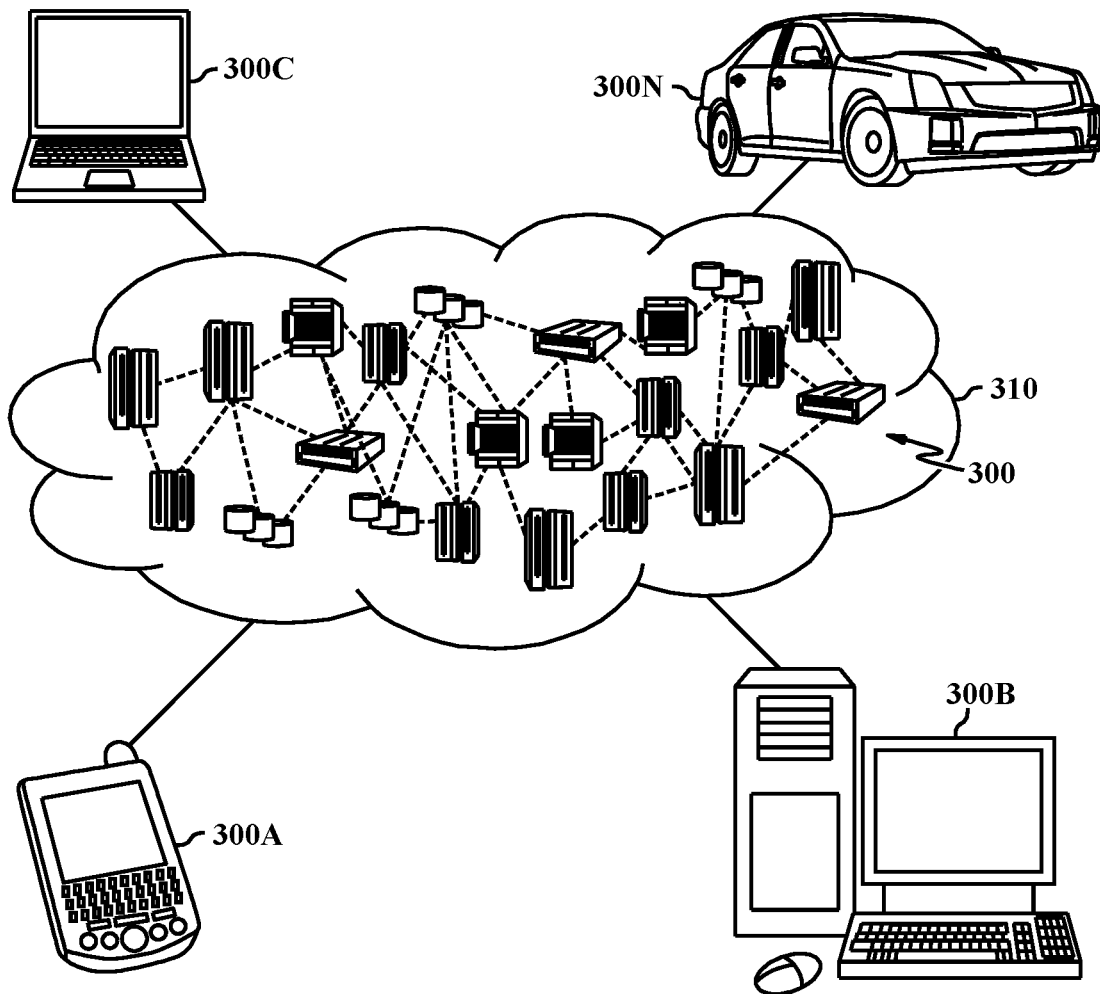
FIG. 3A illustrates a cloud computing environment, in accordance with embodiments of the present disclosure.

Referring now to FIG. 3A, illustrative cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing 300 and cloud computing environment 310 can communicate with any type of computerized device over any type of network and/or network addressable connection (e.g., using a web browser).

Figure 3B:
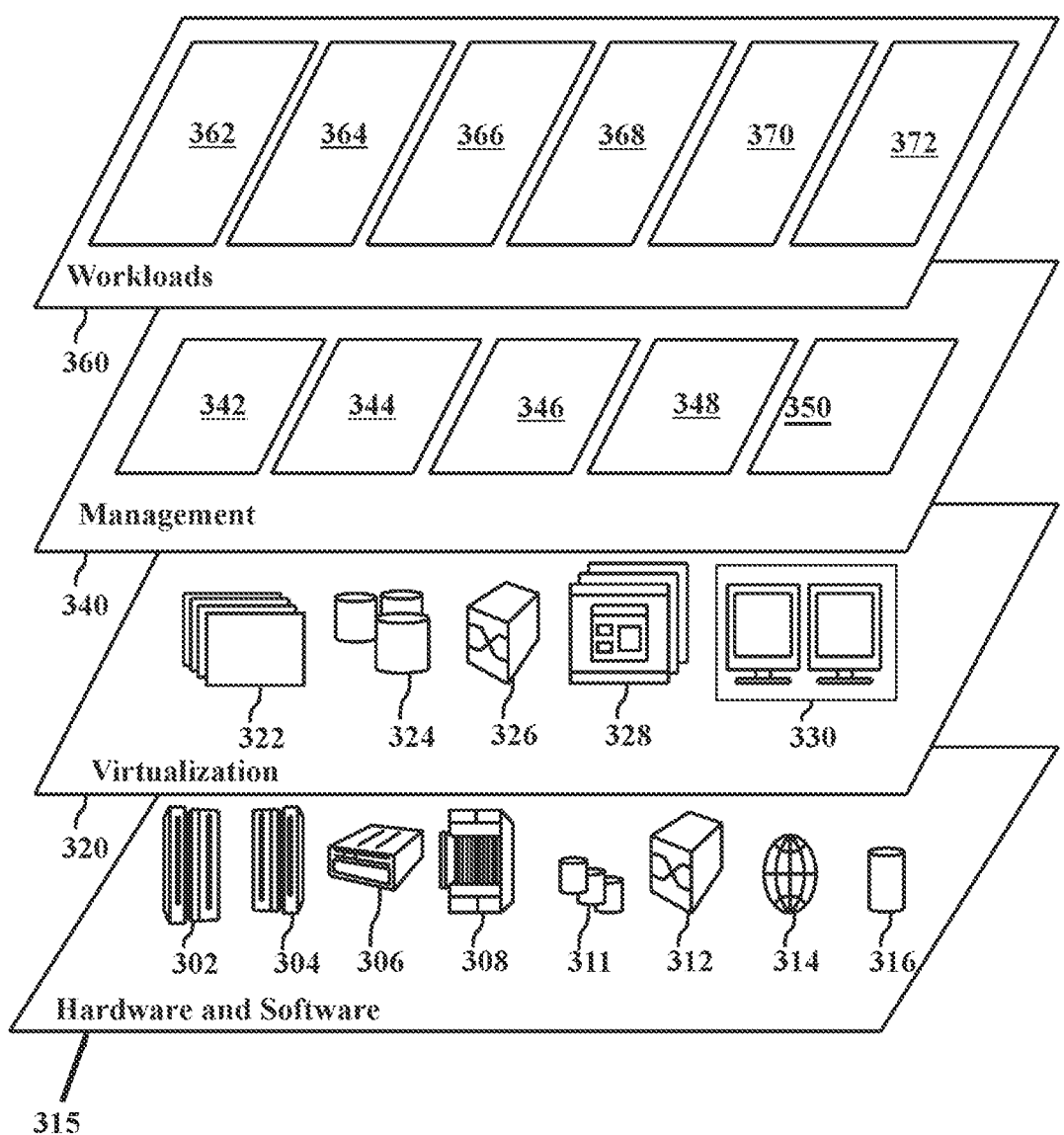
FIG. 3B illustrates abstraction model layers, in accordance with embodiments of the present disclosure.

Referring now to FIG. 3B, a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and command information displaying 372.

Figure 4:
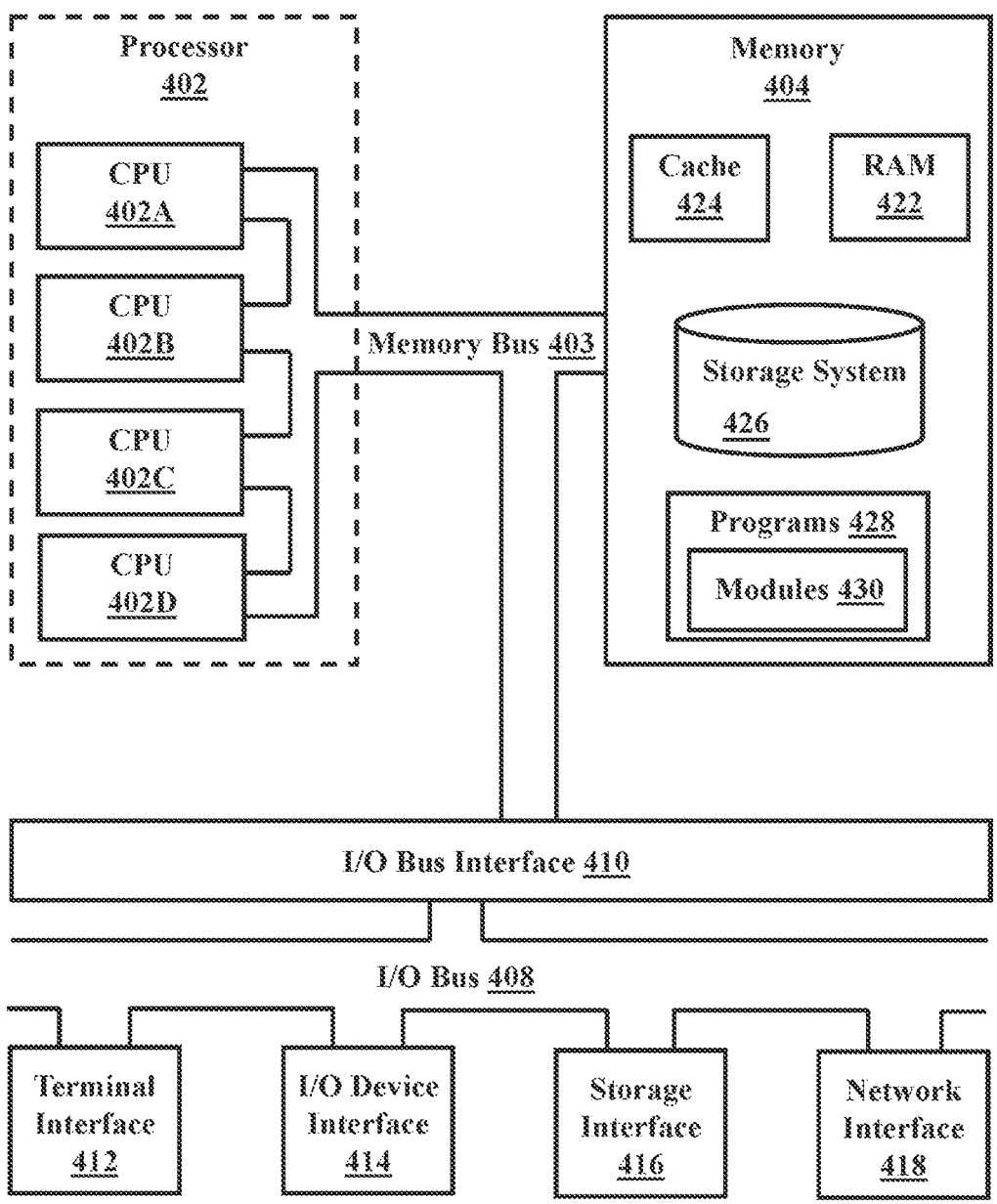
FIG. 4 illustrates a high-level block diagram of an example computer system that may be used in implementing one or more of the methods, tools, and modules, and any related functions, described herein, in accordance with embodiments of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present invention. In some embodiments, the major components of the computer system 401 may comprise one or more Processor 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for managing a smart device, the method comprising:
   receiving, by a processor, a first command and second command from one or more users;
   analyzing the first command and the second command using an artificial intelligence (AI) algorithm which analyzes historical command information and compares the analyzed historical command information with the first command and the second command;
   determining command information associated with the first command and the second command based on the AI algorithm, wherein the command information comprises first information generated by natural language processing (NLP) on the first command and the second command, second information regarding a meaning of the first command and the second command, and third information regarding a contradictory relationship between the first command and the second command;
   identifying at least one user from the one or more users by comparing a power bandwidth of a voice of a user associated with at least one of the first command and the second command to voice identifying data from a user profile;
   displaying the command information and the identified at least one user to at least one of the one or more users on a display screen;
   predicting additional command data including at least one predicted meaning of the first command and the second command based on the first information, the second information, and the third information associated with executing the first command and the second command;
   receiving a response including a selected predicted meaning of the at least one predicted meaning from the at least one of the one or more users associated with the command information on the display screen; and
   executing the first command and the second command based, at least in part, on the command information and the response.

2. The method of claim 1, further comprising:
   generating knowledge graph based, at least in part, on the first command and the second command,
   wherein the first command is overlapped with the second command within a predetermined timeline, and the predetermined timeline is determined by a user of the smart device.

3. The method of claim 1, wherein analyzing the first command and the second command, including:
   determining additional information is needed to execute the first command and the second command; and
   requesting the additional information from the one or more users.

4. The method of claim 1, wherein analyzing the first command and the second command includes determining one or more command modifications associated with the first command.

5. The method of claim 1, wherein analyzing the first command and the second command is further based on a command relationship.

6. The method of claim 1, further comprising:
identifying a command relationship associated with the command information of the first command and the second command; and
displaying the command relationship on the display.

7. The method of claim 6, wherein the command information includes at least one command question.

8. A system for managing a smart device, the system comprising:
a memory; and
a processor in communication with the memory, the processor being configured to perform operations comprising:
receiving a first command and a second command from one or more users;
analyzing the first command and the second command using an artificial intelligence (AI) algorithm which analyzes historical command information and compares the analyzed historical command information with the first command and the second command;
determining command information associated with the first command and the second command based on the AI algorithm, wherein the command information comprises first information generated by natural language processing (NLP) on the first command and the second command, second information regarding a meaning of the first command and the second command, and third information regarding a contradictory relationship between the first command and the second command;
identifying at least one user from the one or more users by comparing a power bandwidth of a voice of a user associated with at least one of the first command and the second command to voice identifying data from a user profile; and
displaying the command information and the identified at least one user to at least one of the one or more users on a display screen;
predicting additional command data including at least one predicted meaning of the first command and the second command based on the first information, the second information, and the third information associated with executing the first command and the second command;
receiving a response including a selected predicted meaning of the at least one predicted meaning from the at least one of the one or more users associated with the command information on the display screen; and
executing the first command and the second command based, at least in part, on the command information and the response.

9. The system of claim 8, further comprising:
generating knowledge graph based, at least in part, on the first command and the second command,
wherein the first command is overlapped with the second command within a predetermined timeline, and the predetermined timeline is determined by a user of the smart device.

10. The system of claim 8, wherein analyzing the first command and the second command, including:
determining additional information is needed to execute the first command and the second command; and
requesting the additional information from the one or more users.

11. The system of claim 8, wherein analyzing the first command and the second command includes determining one or more command modifications associated with the first command.

12. The system of claim 8, wherein analyzing the first command and the second command is further based on a command relationship.

13. The system of claim 8, further comprising:
identifying a command relationship associated with the command information of the first command and the second command; and
displaying the command relationship on the display.

14. The system of claim 13, wherein the command information includes at least one command question.

15. A computer program product for managing a smart devices, the computer program product comprising a non-transitory computer readable storage medium having program instructions embodied therewith, the program instructions executable by a processor to cause the processors to perform a function, the function comprising
receiving a first command and a second command from one or more users;
analyzing the first command and the second command using an artificial intelligence (AI) algorithm which analyzes historical command information and compares the analyzed historical command information with the first command and the second command;
determining command information associated with the first command and the second command based on the AI algorithm, wherein the command information comprises first information generated by natural language processing (NLP) on the first command and the second command, second information regarding a meaning of the first command and the second command, and third information regarding a contradictory relationship between the first command and the second command;
identifying at least one user from the one or more users by comparing a power bandwidth of a voice of a user associated with at least one of the first command and the second command to voice identifying data from a user profile; and
displaying the command information and the identified at least one user to at least one of the one or more users on a display screen;
predicting additional command data including at least one predicted meaning of the first command and the second command based on the first information, the second information, and the third information associated with executing the first command and the second command;
receiving a response including a selected predicted meaning of the at least one predicted meaning from the at least one of the one or more users associated with the command information on the display screen; and
executing the first command and the second command based, at least in part, on the command information and the response.

16. The computer program product of claim 15, further comprising:
generating knowledge graph based, at least in part, on the first command and the second command,
wherein the first command is overlapped with the second command within a predetermined timeline, and the predetermined timeline is determined by a user of the smart device.

17. The computer program product of claim 15, wherein analyzing the first command and the second command, including:

determining additional information is needed to execute the first command and the second command; and requesting the additional information from the one or more users.

18. The computer program product of claim 15, wherein analyzing the first command and the second command includes determining one or more command modifications associated with the first command.

19. The computer program product of claim 15, further comprising:

identifying a command relationship associated with the command information of the first command and the second command; and displaying the command relationship on the display.

20. The computer program product of claim 19, wherein the command information includes at least one command question.

\* \* \* \* \*